US010484435B2

(12) United States Patent
Allen

(10) Patent No.: US 10,484,435 B2
(45) Date of Patent: *Nov. 19, 2019

(54) CALL SET-UP SYSTEMS

(71) Applicant: Ericsson AB, Stockholm (SE)

(72) Inventor: John Aubrey Allen, Kenilworth (GB)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/175,931

(22) Filed: Feb. 7, 2014

(65) Prior Publication Data

US 2014/0153569 A1 Jun. 5, 2014

Related U.S. Application Data

(63) Continuation of application No. 10/578,464, filed as application No. PCT/EP2004/052835 on Nov. 5, 2004, now Pat. No. 8,649,372.

(30) Foreign Application Priority Data

Nov. 8, 2003 (GB) .................................. 0326160.9

(51) Int. Cl.
H04L 12/56 (2006.01)
H04L 29/06 (2006.01)
(Continued)

(52) U.S. Cl.
CPC .... H04L 65/1069 (2013.01); H04L 29/06027 (2013.01); H04L 29/125 (2013.01);
(Continued)

(58) Field of Classification Search
CPC ........................... H04L 12/56; H04L 2012/56
See application file for complete search history.

(56) References Cited

U.S. PATENT DOCUMENTS 5,233,603 A * 8/1993 Takeuchi .............. H04L 49/103
370/412
5,729,532 A * 3/1998 Bales ...................... H04L 29/06
370/261
(Continued)

FOREIGN PATENT DOCUMENTS

JP 2002158700 A 5/2002
JP 2002208965 A 7/2002
(Continued)

OTHER PUBLICATIONS

Rosenberg "Supporting Intermediary Session Policies in SIP" Draft-Rosenberg-Sippping-Session-Policy-00.txt, May 2, 2002, XP015005081 Internet Engineering Task Force, Geneva.
(Continued)

Primary Examiner — Hassan A Phillips
Assistant Examiner — Prenell P Jones
(74) Attorney, Agent, or Firm — Coats & Bennett, PLLC

(57) ABSTRACT

A call set-up system sets up a call, which may be a voice call, between terminals through a plurality of packet switched networks using call agents. The networks are interconnected by network address translation (NAT) devices, and the messages to successive call agents include media addresses in the associated networks for the actual data packets of the call when it has been set up. The call set-up message includes the media address sent to at least some preceding call agents enabling NAT resources to be saved. The call agents can be incorporated into NAT devices, and the media addresses can be encrypted or in the form of a reference.

8 Claims, 6 Drawing Sheets

(51) Int. Cl.
*H04L 29/12* (2006.01)
*H04L 29/08* (2006.01)

(52) U.S. Cl.
CPC .. *H04L 29/12009* (2013.01); *H04L 29/12405* (2013.01); *H04L 29/12452* (2013.01); *H04L 29/12518* (2013.01); *H04L 61/2528* (2013.01); *H04L 61/2546* (2013.01); *H04L 61/2564* (2013.01); *H04L 61/2571* (2013.01); *H04L 67/14* (2013.01); *H04L 69/329* (2013.01)

(56) References Cited

U.S. PATENT DOCUMENTS

| | | | |
|---|---|---|---|
| 6,693,892 B1* | 2/2004 | Rinne | H04W 72/0446 370/329 |
| 6,735,621 B1 | 5/2004 | Yoakum et al. | |
| 6,885,658 B1 | 4/2005 | Ress et al. | |
| 6,963,635 B1* | 11/2005 | Jones | 379/114.14 |
| 7,142,532 B2 | 11/2006 | Penfield et al. | |
| 7,246,166 B1* | 7/2007 | Watson | 709/227 |
| 7,274,943 B2 | 9/2007 | Trossen | |
| 7,463,619 B1* | 12/2008 | Prokop | H04L 29/06 370/235 |
| 7,496,625 B1 | 2/2009 | Belcher et al. | |
| 7,574,735 B2 | 8/2009 | Pirttimaa et al. | |
| 7,620,053 B2 | 11/2009 | MeLampy et al. | |
| 8,271,336 B2* | 9/2012 | Mikurak | G06Q 10/087 705/22 |
| 2002/0062376 A1 | 5/2002 | Isoyama | |
| 2002/0103850 A1 | 8/2002 | Moyer et al. | |
| 2002/0120760 A1 | 8/2002 | Kimchi et al. | |
| 2002/0196782 A1* | 12/2002 | Furukawa | H04Q 3/0025 370/352 |
| 2003/0076813 A1 | 4/2003 | Isomaki | |
| 2003/0112808 A1 | 6/2003 | Solomon | |
| 2003/0123619 A1 | 7/2003 | McKinnon et al. | |
| 2003/0126615 A1 | 7/2003 | Fukada | |
| 2003/0148778 A1* | 8/2003 | Burdue | H04W 88/04 455/517 |
| 2003/0154400 A1 | 8/2003 | Pirttimaa et al. | |
| 2003/0161332 A1 | 8/2003 | Ohno et al. | |
| 2003/0191663 A1* | 10/2003 | Sameh | G06Q 50/24 705/2 |
| 2004/0030791 A1 | 2/2004 | Dorenbosch et al. | |
| 2004/0054902 A1 | 3/2004 | Fujimoto et al. | |
| 2004/0071109 A1 | 4/2004 | Herle et al. | |
| 2004/0114590 A1 | 6/2004 | Harris | |
| 2004/0225733 A1* | 11/2004 | Tesink | H04M 3/5158 709/225 |
| 2004/0229596 A1 | 11/2004 | Stura et al. | |
| 2005/0065934 A1 | 3/2005 | Kataoka et al. | |
| 2005/0130641 A1* | 6/2005 | Scott | H04M 1/27455 455/418 |
| 2007/0294263 A1 | 12/2007 | Punj et al. | |
| 2010/0136990 A1 | 6/2010 | Stura et al. | |
| 2011/0311039 A1 | 12/2011 | Zi et al. | |

FOREIGN PATENT DOCUMENTS

| | | |
|---|---|---|
| JP | 2002237814 A | 8/2002 |
| JP | 2003008666 A | 1/2003 |
| JP | 2003060639 A | 2/2003 |
| JP | 2003060711 A | 2/2003 |
| JP | 2003198725 A | 7/2003 |
| JP | 2003273890 A | 9/2003 |
| JP | 2003527786 A | 9/2003 |
| JP | 2004527932 A | 9/2004 |
| JP | 2004531110 A | 10/2004 |
| JP | 2005502219 A | 1/2005 |
| WO | 0131900 A2 | 5/2001 |
| WO | 200219644 A1 | 3/2002 |
| WO | 200249279 A2 | 6/2002 |
| WO | 2002058349 A1 | 7/2002 |
| WO | 2002061604 A1 | 8/2002 |

OTHER PUBLICATIONS

Aoun et al. "Identifying Intra-Realm Calls and Avoiding Media Tromboning" Draft-Aoun-Midcom-Intrarealmcalls-00.txt, Feb. 28, 2002, XP015000106 Internet Engineering Task Force, Geneva.

Sen et al. "Identifying Intra-Realm Calls Using STUN" Draft-Sen-Sipping-Intrarealm-Stun-00.txt, Sep. 30, 2002, SP015005211 Internet Engineering Task Force, Geneva.

Rosenberg "Interactive Connectivity Establishment (ICE): A Methodology for Network Address Translator (NAT) Transversal for the Session Initiation Protocol (SIP)" Draft-Rosenberg-Sipping-Ice-01.txt, Jun. 30, 2003, XP015005078 Internet Engineering Task Force, Geneva.

Umschaden, K. et al., "End-to-end Security for Firewall/NAT Traversal within the Session Initiation Protocol (SIP)", Internet Engineering Task Force, May 2003, pp. 1-32, Vienna University of Technology.

Rosenberg, J. et al., "An Offer/Answer Model with the Session Description Protocol (SDP)", Network Working Group Request for Comments: 3264, Obsoletes: 2543, Category: Standards Track, Jun. 2002, pp. 1-25, Columbia University.

* cited by examiner

Processing for session description 'offer' message

| Rule No | Condition | Action taken on match |
|---|---|---|
| 1 | --- | --- |
| 2 | Stack contains an entry for the region being entered by the 'offer' message | pop stack until deepest matching entry is new SD close pinhole |
| 3 | --- | --- |
| 4 | no other rule applies | push the existing SD to the stack translate the SD to match NAT settings |

Processing for session description 'answer' message

| Rule No | Condition | Action taken on match |
|---|---|---|
| 1 | Pinhole has been closed during 'offer' processing | push duplicate of SD to stack |
| 2 | Stack contains an entry for the region being entered by the 'answer' message | pop stack until deepest matching entry is new SD close pinhole |
| 3 | Stack has no entry for the region being left by the 'answer' message | push duplicate SD to stack close pinhole |
| 4 | no other rule applies | push the existing SD to the stack translate the SD to match NAT settings |

*FIG. 4*

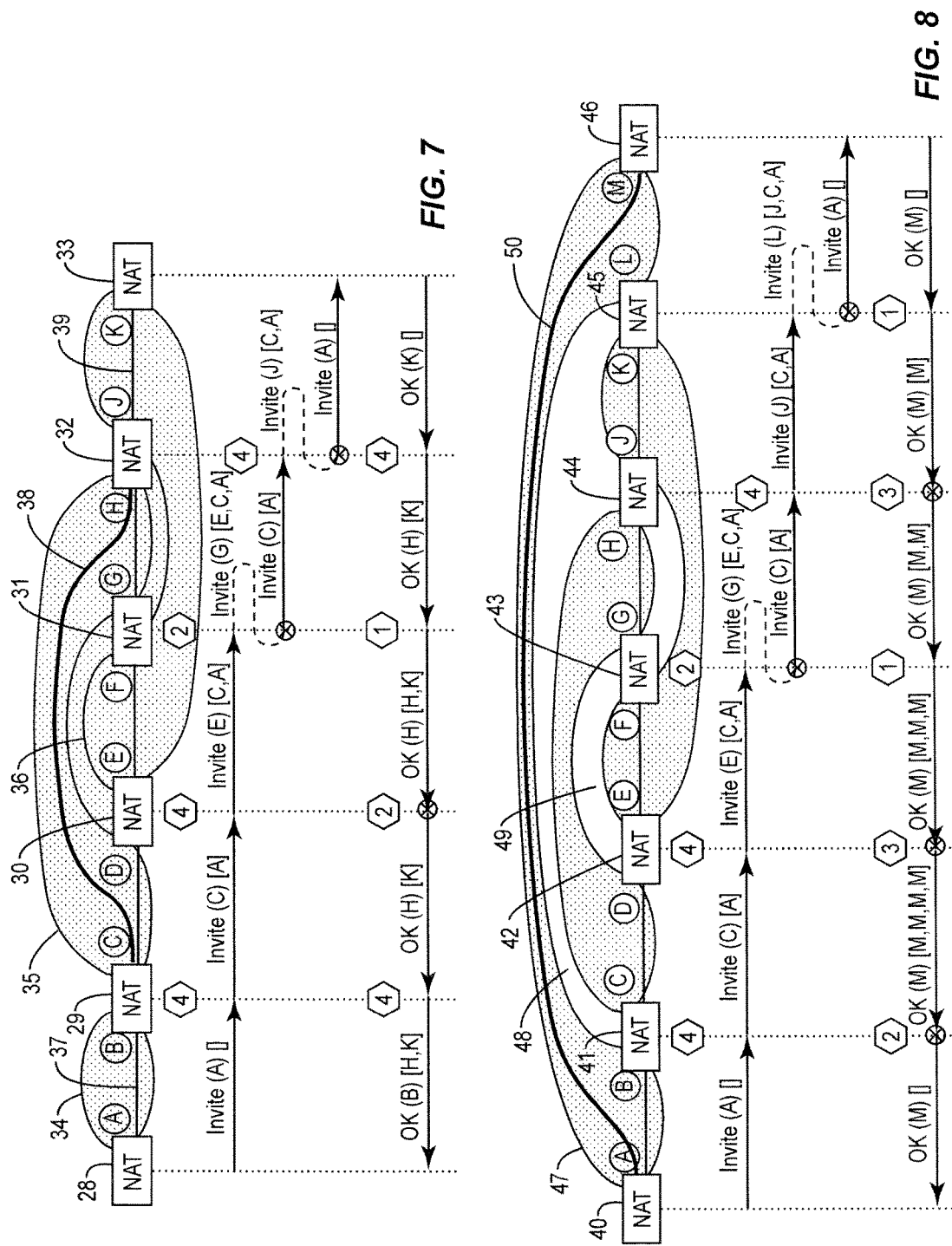

CALL SET-UP SYSTEMS

CROSS-REFERENCE TO RELATED APPLICATIONS

This application is a continuation application of U.S. patent application Ser. No. 10/578,464 filed Mar. 15, 2007, which is a National Stage of International Application No. PCT/EP2004/52835 filed Nov. 5, 2004, which claims priority from foreign application GB 0326160.9, filed in the United Kingdom on Nov. 8, 2003, the disclosures of each of which are incorporated herein by reference in their entirety.

BACKGROUND

This invention relates to call set-up systems.

Call set-up systems are known in which call set-up involves a plurality of call agents associated with respective packet-switched networks which are connected to each other by means of NAT (network address translation) devices, also known as address translators. The NAT devices define addresses within one network which provide a connecting path to the other network to which it connects. The call set-up devices define a series of addresses, including those of NAT devices, via which the media packets of the call are sent. In a call between two user terminals, for example, there are two paths between the two terminals, one in each direction. Typically, the media call takes place between one or more private networks joined by the internet. The invention is particularly concerned with voice calls. There is increasing interest in using IP (Internet Protocol) for voice in place of the usual circuit-switched telecommunications network, because there are maintenance savings if one network can be used for two different functions.

One known protocol for initiating voice calls via the internet is Session Initiation Protocol (SIP-RFC 3261), although it can also be used for initiating calls using other interactive media such as video or games. This protocol is adapted for use in the case of calls involving private networks and the internet.

FIG. 1 shows the set-up of a call using SIP signalling, between two networks. A call is made from user agent P in network 1, for example, a private network, to user X (not shown) in the central network 2, for example, the internet. It is forwarded on behalf of user X by call agent S to user agent V, which is in the same private network 1 as the caller.

All SIP signalling messages are shown in FIG. 1, but the text of messages is not shown. SIP messages are standard messages whose format can be seen from IETF call examples documents.

User agent P initiates a call by sending an SIP Invite message to its local call agent Q. This message contains a session description (Session Description Protocol—RFC 2327) indicating the media characteristics and the address (1.1.1.1) at which user agent P wishes to receive media packets. For convenience, only the last two segments of this address, and of other addresses, are shown in FIG. 1.

Call agent Q responds with a SIP '100: trying' message.

Call agent Q determines that the destination, X, of the call is in the central network 2, and that this is reached via a network NAT device R which it controls. It therefore opens a pinhole in NAT device R to permit a media flow from the central network to the media address of user agent P (1.1.1.1). The address returned to call agent Q by NATR (2.2.2.1) is then used in an Invite message sent by call agent Q to call agent S in the central network (A pinhole is a path through the NAT device that is opened specifically for a single media flow. The term 'pinhole' emphasises that only packets with a particular combination of source and destination addresses will pass through the NAT device, while other packets that do not match a pinhole will be blocked.)

Call agent S responds with a '100: trying' message.

Call agent S determines that user X has requested that their calls be forwarded to user agent V, and that the new destination is reached via call agent U in private network 1. User X could be a home telephone number accessible via the internet, and the user could have set up an arrangement for their calls to be forwarded to their office in the private network 1. Call agent S therefore passes on the Invite message with a changed URI (Uniform Resource Identifier), in this case, the name of the communications resource defining the destination of the call, to call agent U.

Call agent U responds with a '100: trying' message.

Call agent U recognises that the call has arrived from a different network via a NAT device T that it controls. It therefore opens a pinhole in NAT device T to permit a media flow from the edge network 1 to the media address within the central network (2.2.2.1). The address returned by NAT device T (1.1.1.3) is then used in the Invite message sent to user agent V.

The call has now reached its destination. User agent V responds with a '180: ringing' message that is passed back to the caller via the chain of call agents.

When the call is answered, user agent V sends a '200: OK' message back to call agent U. The message contains a session description indicating the media characteristics and the address (1.1.1.4) at which user agent V wishes to receive media packets.

Call agent U recognises that this message is for a call that arrived via NAT device T that it controls. It therefore opens a pinhole in NAT device T to permit a media flow from the central network 2 to the media address within the edge network (1.1.1.4). The address returned by NAT device T (2.2.2.2) is then used in the OK message passed on to call agent S.

The OK message is passed back by call agent S to call agent Q.

Call agent Q recognises that this call passes through NAT device R that it controls. It therefore opens a pinhole in NAT device R to permit a media flow from the edge network 1 to the media address within the central network (2.2.2.2). The address returned by NAT device R (1.1.1.2) is then used in the OK message passed on to user agent P.

User agent P then completes the SIP signalling sequence by sending an ACK message. This is passed along the chain of call agents to the called user agent V. The user agents have each received an address within their local network to which media packets should be sent. This is the address of their local network address translation device, R and T. The NAT devices have been configured to send media packets received from the edge network 1 to the address of the other NAT device within the middle network 2. The NAT devices have also been configured to send media packets received from the middle network to the address of the user agents in the edge network 1. Media packets can therefore be sent between the two user agents P,V via the two NAT devices R and T via media paths 3, 4, 5 in one direction, and via media paths 3a, 4a, 5a in the return direction.

The resulting media flow is looped unnecessarily through the central network 2, through paths 4, 4a.

It will be seen that IP calls traversing multiple NAT devices lose information about preceding networks at each NAT device. If the call is routed back into a network segment that it has already traversed, then it is not possible to connect directly in that network segment. This can result in unnecessary network traffic and over-use of some network paths.

In one particular application, the edge network could be a small office, NATs T and R could be incorporated into one personal computer which can communicate with the internet 2, and user agents P and V could be other personal computers, and there could be further personal computers (not shown) in the edge network. The personal computers could all be in speech communication with each other using SIP, albeit via the personal computer in communication with the internet. Unfortunately, each time a call is set up, such as between user agents P and V, it traverses NATs T and R, and uses up scarce media paths. The reason for going via the NAT pinholes is that the normal SIP protocol requires media addresses to be selected before the call agent determines the final destination of the call. If a route via the NAT is selected then the call will succeed if it terminates in a different network, and (by means of constructing another pinhole to re-enter the original network) will also succeed if the call terminates back in the same network as its origin. Selecting a NAT route for all calls is thus the safe option that will always work, albeit inefficiently.

A further example is shown with reference to FIG. 2, which shows the set-up of a call using SIP signalling, between three networks. A call originating at device A in network 6 (Office LAN 1) is initially routed via the internet 7 to device B in network 8 (Office LAN 2), and then forwarded to device C in network 6. As the call traverses each NAT device 9,10 connecting the networks, information about the previous network is lost. The resulting call therefore consumes resources in all three networks. It will be noted that in FIG. 2, both outward and return paths of the call are shown as a single line. This convention also applies to the other figures.

A solution known as dropback re-routing has been proposed using techniques such as the '302: Moved temporarily' response defined in SIP RFC3261, under which a new call is established directly between A and C, but this means that the call is no longer able to be controlled by devices elsewhere in the network (such as device B).

BRIEF SUMMARY

The invention provides a call set-up system, for the set-up of calls in a plurality of packet-switched networks connected to each other by network address translation (NAT) devices using a plurality of call agents, comprising means to send messages to successive call agents, which messages include address information for media packets within networks associated with the call agents, to define the media path of the call, at least some of the messages also including address information for media packets sent to preceding call agents involved in the set-up of the call.

The system allows the media path of the call to take advantage of possible short-cuts because call set-up does not only pass, as hitherto, address information for media packets within the network associated with the call set-up device, but also address information within networks associated with previous call set-up devices as well. Thus, if a call was set up from a first network to a second, and then back to the first, the messages passed would enable the media path of the call to be local to the first network only rather than, as hitherto, traversing addresses in the second network.

The present invention allows the route of associated media flows to be optimised. The call signalling, which consumes little network resource, could retain its original path.

BRIEF DESCRIPTION OF THE DRAWINGS

Call set-up systems in accordance with the invention will now be described in detail, by way of example, with reference to the accompanying drawings, in which:

FIG. 4 shows the rules applied in the modified SIP signalling;

FIGS. 6 to 8 show the set-up of calls using the modified SIP signalling for a series of networks, in which the call does re-enter an earlier network.

DETAILED DESCRIPTION

Figure 3:
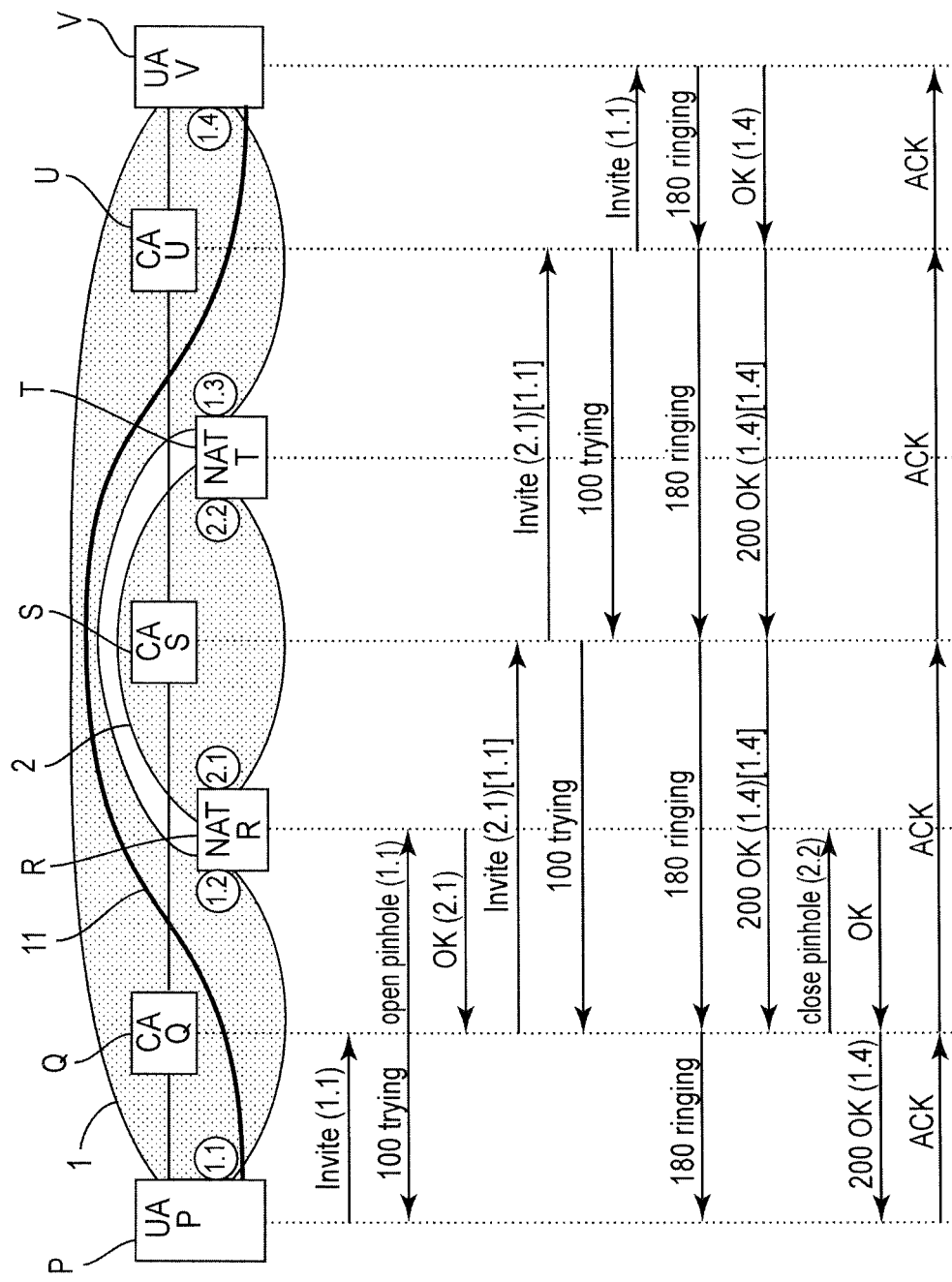
FIG. 3 which shows the set-up of a call using modified SIP signalling according to the invention.

All SIP signalling messages are shown in FIG. 3, but only extracts from the text of messages are shown below. The basic format of SIP messages can be seen from IETF call examples documents.

Figure 1:
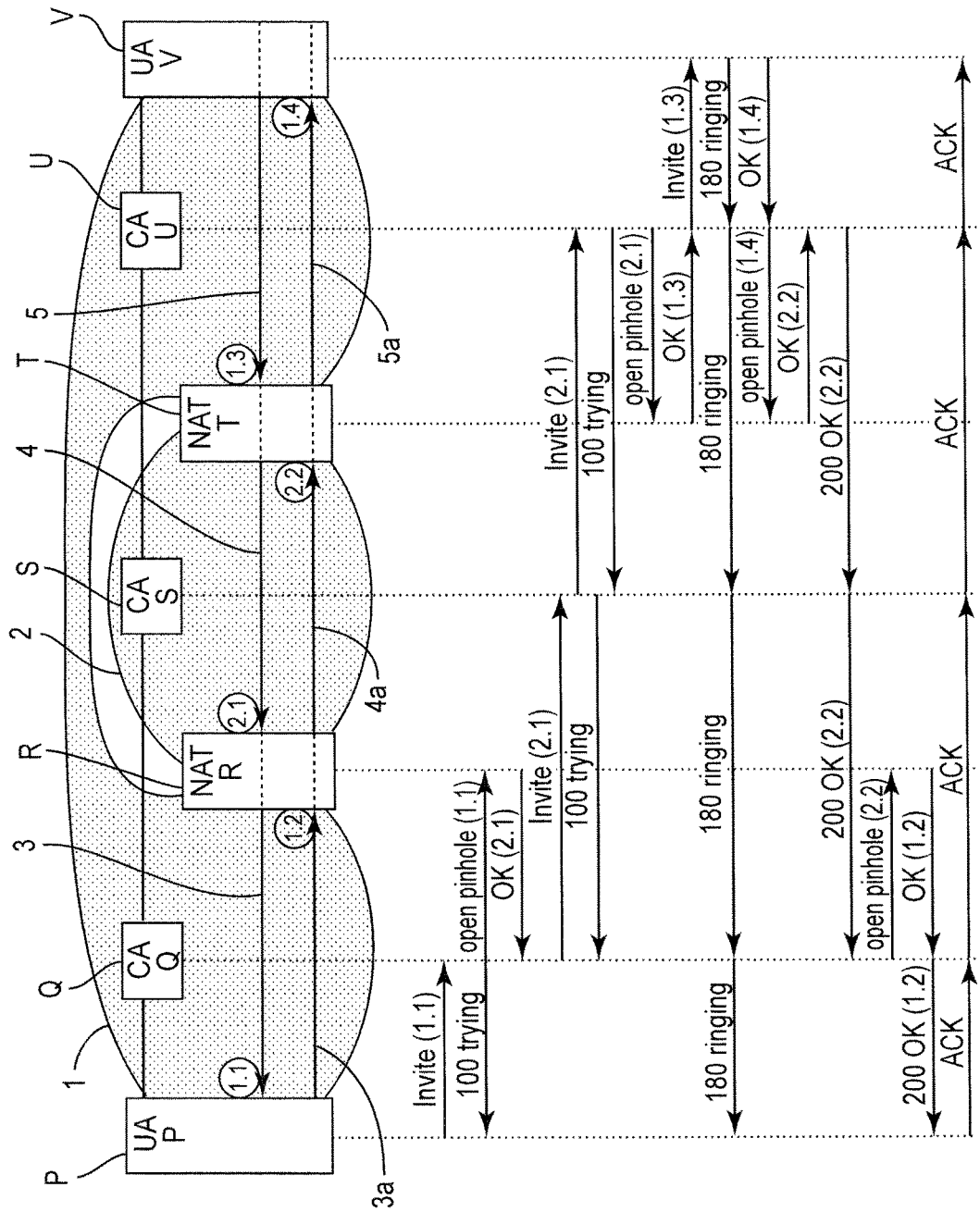
FIG. 1 shows the set-up of a call using SIP signalling between two networks.
Figure 2:
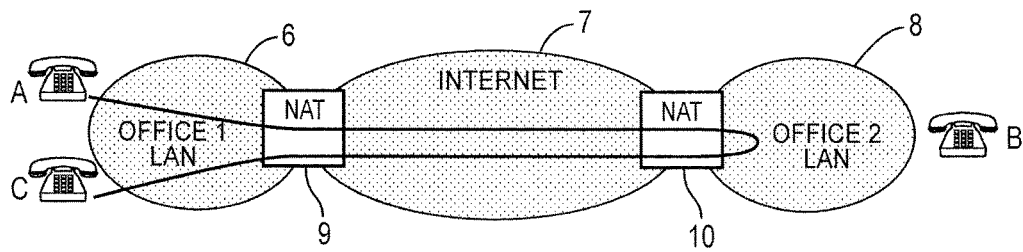
FIG. 2 shows the set-up of a call using SIP signalling between three networks.

As with the example of known SIP signalling described with reference to FIG. 1, network 1 could be a private network, and network 2 could be the internet. User agent P initiates a call by sending an SIP Invite message to its local call agent Q. This message contains a session description indicating the media characteristics and the address (1.1.1.1) at which user agent P wishes to receive media packets. For convenience, only the last two segments of this address, and of other addresses, are shown in FIG. 3.

The full text of a typical Invite message is as follows, following a standard in IETF documents:

INVITE sip:xxx@uax.middle.com SIP/2.0
Via: SIP/2.0/UDP uap.edge.com:5060;branch=z9hG4bK74bf9
Max-Forwards: 70
From: UserP;tag=9fxced76sl
To: UserX
Call-ID: 38482762982201885111@uap.edge.com
CSeq: 2 INVITE
Contact: <sip:ppp@uap.edge.com
Content-Type: application/sdp
Content-Length: 151
v=0
o=ppp
s=-
c=IN P4 1.1.1.1
t=0 0
m=audio 49172 RTP/AVP 0
a=rtpmap:0 PCMU/8000
Call agent Q responds with a SIP '100: trying' message.

Call agent Q determines that the destination of the call is in the central network 2, and that this is reached via a NAT device R which it controls. It therefore opens a pinhole in NAT device R to permit a media flow from the central network to the media address of user agent P (1.1.1.1). The address returned by NAT device R (2.2.2.1) is then used in an Invite message sent to call agent S in the central network.

INVITE sip:xxx@uax.middle.com SIP/2.0
Via: SIP/2.0/UDP caq.edge.com:5060; branch=298bnsdhj2ka
Via: SIP/2.0/UDP uap.edge.com:5060; branch=z9hG4bK74bf9
Max-Forwards: 69
From: UserP;tag=9fxced76sl
To: UserX
Call-ID: 38482762982220188511@uap.edge.com
CSeq: 2 INVITE
Contact: <sip:ppp@uap.edge.com
Content-Type: multipart/mixed
Boundary: "**part separator**"
Content-Type: application/sdp
Content-Length: 151
v=0
o=ppp
s=–
c=IN IP4 2.2.2.1
t=0 0
m=audio 5378 RTP/AVP 0
a=rtpmap:0 PCMU/8000
**part separator**
Content-Type: application/localswitchstack
NetworkID: edge.com
v=0
o=ppp
s=–
c=IN IP4 1.1.1.1
t=0 0
m=audio 49172 RTP/AVP 0
a=rtpmap:0 PCMU/8000
**part separator**

The SIP message syntax requires a string to be defined to separate the various 'attachments' to the message.

As with a typical SIP Invite message, the message contains the address "c=IN IP4 2.2.2.1" at which the NAT device R receives messages for transmission to User Agent P.

However, in accordance with the invention, call agent Q also places the previous session description within a stack structure as a multipart attachment to the SIP message, and this contains the network ID (in this case, "edge.com"), and the address in the edge network 1, "c.dbd.IN IP4 1.1.1.1", at which the User Agent P wished to receive media packets. This is shown in FIG. 3 in the first arrow in a descending direction extending from call agent Q to call agent S. The protocol relies on each address region (between NAT devices) having a globally unique identifier that can be recognised by all call set-up devices within that region. For SIP, this may in many cases derived from the domain name of the SIP server (as used in the SIP global call reference identifier). Call agent S responds with a '100: trying' message.

Call agent S determines that user X has requested that their calls be forwarded to user agent V, and that the new destination is reached via call agent U in private network 1. User X could be a home telephone number accessible via the internet, and the user could have set up an arrangement for their calls to be forwarded to their office in the private network 1. It therefore passes on the Invite with a changed URI. The stack structure described above is however retained.

Call agent U responds with a '100: trying' message.

Call agent U recognises that the call has arrived from a different network via NAT device T that it controls. It notices that the SIP message contains a local switching stack, and examines the Network ID values of the entries in the stack to see if the call has passed through this network before. In this case it finds an entry for its own network ("edge.com"), and therefore uses the session description from this stack entry in the message it passes. No pinhole therefore needs to be opened in NAT device T. The Invite message sent to User Agent V just therefore contains the address (1.1.1.1) in network 1, that is, just the local address, rather than the stack. This Invite message is as follows.

INVITE sip:vvv@uay.edge.com SIP/2.0
Via: SIP/2.0/UDP cau.edge.com:5060, branch=7tfvjyufh67
Via: SIP/2.0/UDP cas.middle.com:5060; branch=345hg2kuffs
Via: SIP/2.0/UDP caq.edge.com:5060; branch=298bnsdhj2ka
Via: SIP/2.0/UDP uap.edge.com:5060; branch=z9hG4bK74bf9
Max-Forwards: 67
From: UserP;tag=9fxced76sl
To: UserX
Call-ID: 38482762982220188511@uap.edge.com
CSeq: 2 INVITE
Contact: <sip:ppp@uap.edge.com
Content-Type: application/sdp
Content-Length: 151
v=0
o=ppp
s=–
c=IN IP4 1.1.1.1
t=0 0
m=audio 49172 RTP/AVP 0
a=rtpmap:0 PCMU/8000

The call has now reached its destination. User agent V responds with a '180: ringing' message that is passed back to the caller via the chain of call agents.

When the call is answered, user agent V sends a '200: OK' message back to call agent U. The message contains a session description indicating the media characteristics and the address (1.4) at which user agent V wishes to receive media packets. A typical message would read as follows.

SIP/2.0 200 OK
Via: SIP/2.0/UDP cau.edge.com:5060; branch=7tfvjyufh67
Via: SIP/2.0/UDP cas.middle.com:5060; branch=345hg2kuffs
Via: SIP/2.0/UDP caq.edge.com:5060; branch=298bnsdhj2ka
Via: SIP/2.0/UDP uap.edge.com:5060; branch=z9hG4bK74bf9
From: UserP;tag=9fxced76sl
To: UserX
Call-ID: 38482762982220188511@uap.edge.com
CSeq: 2 INVITE
Contact: <sip:vvv@uay.edge.com
Content-Type: application/sdp
Content-Length: 151
v=0
o=vvv
s=– c=IN IP4 1.1.1.4
t=0 0
  m=audio 45678 RTP/AVP 0
  a=rtpmap:0 PCMU/8000

Call agent U recognises that this message is for a call for which it invoked the local switching function. To allow compatibility with call agents that have not implemented the local switching functions (i.e. using unmodified SIP signalling), it constructs a stack containing a copy of the session description provided by user agent V, and sends this 200 OK message to call agent S, which passes it back to call agent Q. Call agent Q recognises that this call passes through NAT device R that it controls, and that the message contains a local switching stack. It therefore examines the stack to find entries for its own network. A matching entry is found, and is popped from the stack, that is, all higher entries on the stack are removed and discarded, the matching entry is used as the new SDP, and any remaining lower entries are left on the stack, to form the session description in the SIP message that will be passed to user agent P. Since local switching has been invoked, the pinhole that was created during processing of the Invite message is no longer required, and is therefore deleted.

User agent P then completes the SIP signalling sequence by sending an ACK message. This is passed along the chain of call agents to the called user agent. The user agents have each received an address within their local network to which media packets should be sent. Since local switching has been invoked, this is the address of the other user agent. Single local media path 11 is used for the traffic. All superfluous pinholes within the NAT devices have been closed.

In normal SIP operation, the NAT controller re-writes the SDP (Session Description Protocol (RFC 2616)) address information and discards the incoming address. If the call subsequently loops back into the originating network, the address information from that network has been lost and a local connection cannot be made. The scheme according to the invention with local switching avoids loss of information by pushing the previous session description onto a stack carried forward in the SIP signalling messages. When a call enters a new network, the stack is scanned for entries previously inserted by this network. If an entry is found and local switching is permitted, then the stack is popped back to the original state in this network region. This means that the pinhole most recently allocated during re-entry to the region will not be required, and can be closed immediately.

It will be appreciated that the invention is an addition to SIP that permits flexible control of local switching where calls traverse a number of NAT devices. It should be noted that the SIP signalling performed by the user agents is unchanged by the presence of the local switching function, but that the media paths have been optimised. The protocol is implemented by the call agents that control the transit of SIP media flows through the NAT devices, and these may be separate devices as in the embodiment of FIG. 3, or incorporated in the NAT devices, as in the embodiments of FIGS. 5 to 9. Further, the call agents Q and U may be in the network 2 instead of in the network 1, if desired. This could be useful in the case of a small office edge network, where call agents in the internet 2 could be used. The embodiments may also incorporate legacy call set-up devices such as in FIG. 9, and such legacy devices need only transit the additional information generated by the call set-up devices.

While the description above has been in relation to SIP signalling, the principle may be extended to other signalling protocols based on offer/answer session descriptions to obtain the same benefits. Whatever the signalling protocol, the address region (between NAT devices) must have a globally unique identifier that can be recognised by all call set-up devices within that region.

For SIP, the identifier may in many cases derived from the domain name of the SIP server (as used in the SIP global call reference identifier). SIP uses an offer/answer protocol (RFC 3264) to convey bearer information. A session description is sent in each direction, indicating the media channels, addresses and codecs to be used. A NAT control device (such as an ALG (Application Level Gateway)) re-writes the address information in the session descriptions to match the address translations configured in its local NAT device.

If features are present that require local switching to be inhibited they should simply delete the stack as they transit the message. This will force the media flow through the local network address. This approach could be applied independently for each direction of session description, but in some cases this would result in different NAT devices being used for each direction, and would result in bypassed pinholes remaining open. Processing of the stack is therefore modified for the backward session description.

The invention will now be further explained with reference to FIGS. 4 to 9. FIG. 4 shows the rules and actions to be applied at each at each call agent. The rules should be checked in the order shown until a matching rule is found. It can be seen that the rules are the same in both directions, except that rules 1 and 3 will never apply for an 'offer' message, and need not be checked. The rule number used when processing a message at each NAT device is shown within a hexagon in each of the following embodiments described with reference to FIGS. 5 to 9.

Figure 5:
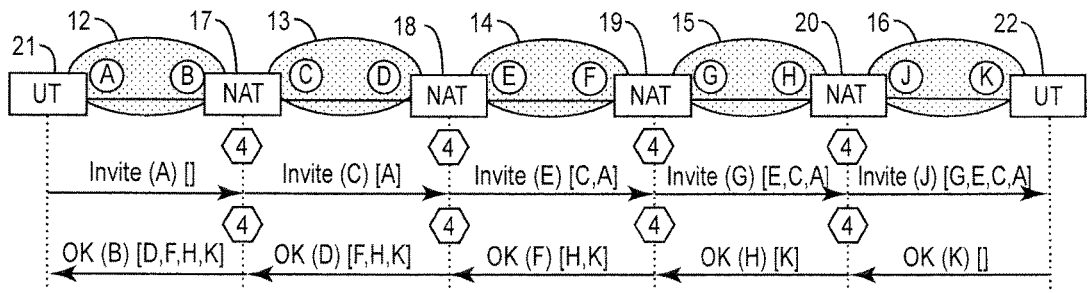
FIG. 5 shows the set-up of a call using the modified SIP signalling for a series of networks, in which the call traverses several networks but does not re-enter an earlier network.
Figure 6:
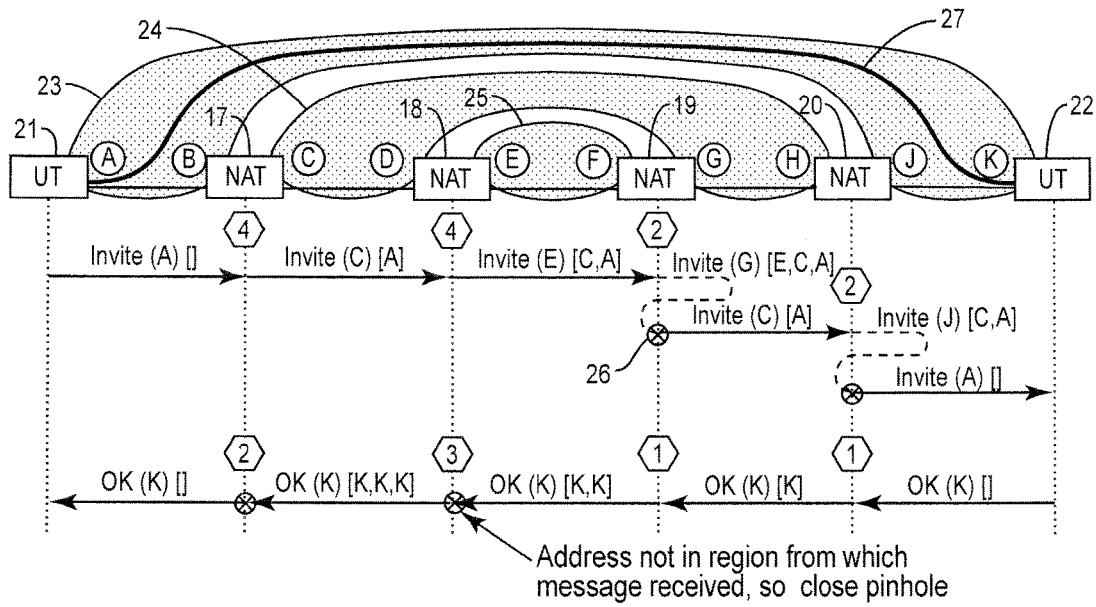

In the embodiments of FIGS. 5 to 9, the call agents are incorporated in the NAT devices, and are not shown separately. In the embodiment of FIG. 5, there are five networks 12-16, joined by four NAT devices 17-20. The letters A and K represent addresses of user terminals 21,22, and the letters B-J represent addresses of pinholes through the NAT devices. None of the networks is common to more than one pair of NAT devices. As with the embodiment of FIG. 3, the call agents in the NAT devices place the previous session description within a stack structure as a multipart attachment to the SIP Invite message sent to each successive NAT device. For example, the Invite SIP message sent to NAT device 18 includes the address C of the pinhole opened through the NAT device 17, but also the address A of the user terminal 21 in network 12 (see second arrow to the right in first line of arrows in FIG. 5).

While the previous session description is passed along, there are no shortcuts possible for the media path between the terminals 21 and 22 because of the lack of common networks. Only Rule 4 applies. The address received in the session description is sent to the NAT device, and replaced by the address from the NAT device in the message passed on by the call agent. This can be viewed as 'translating' the address within the SDP, and it must match the address translation that will be performed on media packets by the NAT device itself.

The embodiment of FIG. 5 is to demonstrate that the invention does not disrupt calls that traverse several networks but do not re-enter an earlier network. Referring to the embodiment of FIG. 6, there are three networks 23-25, joined by NAT devices 17-20. Network 23 is common to NAT devices 17 and 20, and network 24 is common to NAT device pairs 17,18 and 19,20.

Thus, when the SIP Invite message is passed from the call agent for network 25 to the call agent for network 24, Rule 2 applies, the stack of session descriptions is scanned through and replaced with the part of the stack that is headed by the earliest preceding session description for the network 24. Thus, the stack of (G) [E,C,A] is replaced by (C)[A]. No pinhole is required to re-enter network 24, as indicated by circle 26.

Equally, the session description reverts to that of network 23 when the Invite SIP message is passed to the call set-up device associated with re-entry into network 23. Rule 2 applies, and the stack of addresses (J)[C,A] is replaced just by (A) [ ], and the pinhole for re-entry into region 23 is closed. The media path of the call thus set up takes place wholly within the network 23, as path 27.

A pinhole is closed due to the operation of Rule 3 on the O.K. answer message. There are multiple Ks, not just one, in the answer path, arising from processing rules 1 & 3, which duplicate the session descriptions on the stack. It is needed in order to handle networks (like FIG. 9) containing old call agent/NATs that do not implement the invention. Without this action the SDP could be lost when it passes through an old call agent. However, when it is not lost this action results in multiple copies of the SDP on the stack. These are discarded during subsequent processing if the call loops back into a previous network.

In the embodiment of FIG. 7, terminals and NAT devices 28-33 are joined by networks 34-36, and the resulting media path has three sections 37-39. The offer/answer messages, and the Rules applicable when processing a message at the NAT device, are shown in FIG. 7.

The embodiment of FIG. 8 has one further NAT device, so that the terminals and NAT devices are designated 40-46, and there are still only three networks 47-49, since the network 47 is common to both terminals 40,46, allowing a single local media path 50 for the call eventually set up. The offer/answer messages, and the Rules applicable when processing a message at the NAT device, are shown in FIG. 8.

The session description stack may reveal details of a call to other networks that some operators wish to keep private. Since the only requirement on the format of stack entries is that a network can traverse the stack and recognise its own entry, there is nothing to prevent network devices from using encryption to ensure privacy of their stack data. Alternatively, networks may send a reference (URL) to the stack data as it appeared in their network in place of the session description. This requires that they hold the call state in a way that can be interrogated by any future call receiving the reference in the bearer info stack (e.g XML (Extensible Markup Language) document retrievable via HTTP (Hypertext Transfer Protocol (RFC 2616))). The use of URLs will, however result in additional signalling between call handling devices in any network using this technique.

Figure 9:
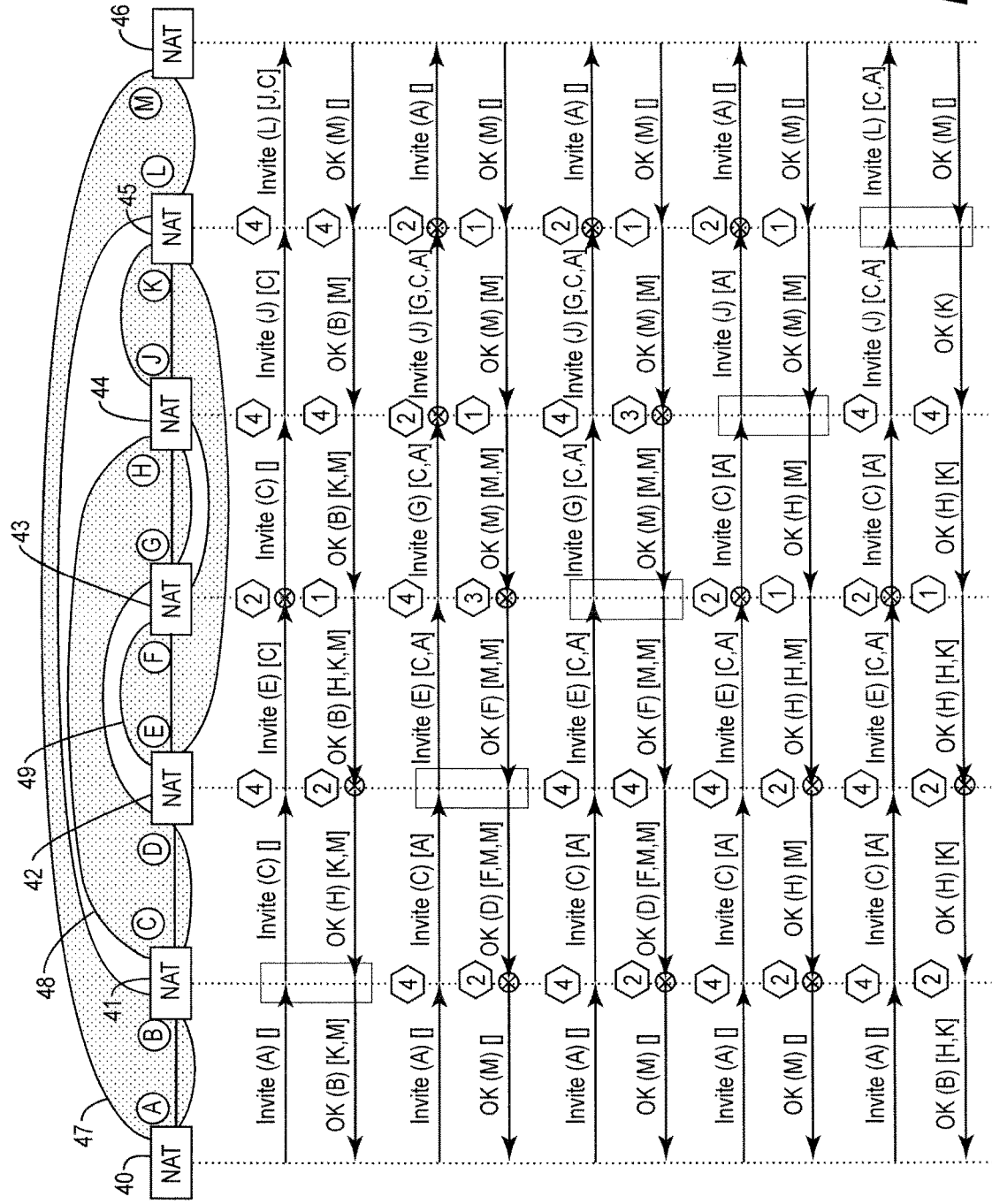
FIG. 9 shows the set-up of calls using the modified SIP signalling for a series of networks, in which the call does re-enter an earlier network, but in which various of the network address translation devices and their controlling call agents are legacy devices using unmodified SIP signalling.

NAT controllers (call agents such as Q, T but not S) and SIP servers are already widely deployed without support for the local switching technique described here. FIG. 9 illustrates the impact that such devices may have on local switching. The embodiment is identical to that of FIG. 8, but successive pairs of lines show the effect when various of the NAT devices are legacy equipment using conventional, not modified, SIP signalling. Thus, the first pair of lines shows the situation when the NAT device 41 is legacy equipment. The Invite message to the call set-up device associated with network 48 simply replaces the address (A) with the address (C). The various applicable Rules when processing a message at the NAT device, are shown.

SIP devices (other than NAT controllers) may either transit the stack information unchanged, or delete the stack information. If the stack is transited unchanged, then local switching will operate normally. If the stack is deleted, then the media will be forced to traverse the network containing the incompatible device. Incompatible NAT controllers may transit the stack unchanged, or delete the stack. It is assumed that no NAT controller would try to translate possible address fields in sections of the SIP message that it did not understand. If this did occur, other networks could prevent the problem by using simple data scrambling within stack entries. This would operate in the same way as the encryption technique described in the section on data hiding. If the stack is deleted, then the media will be forced to traverse the NAT controlled by the incompatible controller. If the stack is transited unchanged, then local switching may be inhibited in some regions, and pinholes may remain open even if they are not subsequently used. In all cases in FIG. 9 both directions of media flow are set up, but the optimum local switching path is not always found, and some unused pinholes are not closed.

The present invention may, of course, be carried out in other ways than those specifically mentioned herein without departing from the essential scope and characteristics of the invention. Therefore, the present embodiments are to be considered in all respects as illustrative and not restrictive, and all changes coming within the meaning and equivalency range of the appended Claims are intended to be embraced therein.

What is claimed is:

1. A method for setting up calls across a plurality of packet-switched networks communicatively connected by network address translation (NAT) devices, the method performed at a first call agent circuit disposed in a packet-switched network and comprising:
   sending messages to and receiving messages from other call agent circuits to define a media path for a call, wherein the messages comprise address information for media packets within the packet-switched networks associated with the other call agent circuits, wherein at least one of the received messages includes address information for media packets received at a preceding call agent circuit involved in the set-up of the call, and wherein the messages sent to the other call agent circuits, and the messages received from the other call agent circuits, are of different message types;
   selecting a set of predetermined rules with which to modify the at least one of the received messages based on a message type for the at least one of the received messages; and
   modifying the at least one of the received messages according to the selected set of pre-determined rules by adding address information to, and deleting address information from, the at least one of the received messages.

2. The method of claim 1 wherein the messages that are sent by the first call agent circuit comprise offer messages, and wherein the received messages that are received at the first call agent circuit comprise answer messages.

3. The method of claim 1 wherein the first call agent circuit is incorporated in a NAT device.

4. A call agent device configured for setting up calls across a plurality of packet-switched networks communicatively connected by network address translation (NAT) devices, the call agent device disposed in a packet-switched network and comprising:
   circuitry configured to:
      send messages to and receive messages from another call agent device to define a media path for a call, wherein the messages comprise address information for media packets within the packet-switched networks associated with the other call agent devices, wherein at least one of the received messages includes address information for media packets received at a preceding call agent device involved in the set-up of the call, and wherein the messages sent to the other call agent circuits, and the received messages received from the other call agent circuits, are of different message types;

select a set of predetermined rules with which to modify at least one of the received messages based on a message type for the at least one of the received messages; and modify the at least one of the received messages according to the selected set of pre-determined rules by adding address information to, and deleting address information from, the at least one of the received messages.

5. The call agent device of claim 4 wherein the circuitry is incorporated in a NAT device.

6. The call agent device of claim 4 wherein the messages sent by the circuitry comprise offer messages, and wherein the received messages received by the circuitry comprise answer messages.

7. A network address translation (NAT) device for setting up calls across a plurality of packet-switched networks communicatively connected to each other by NAT devices, the NAT device comprising:

call agent circuitry configured to send messages to and receive messages from a plurality of remote call agents to define a media path for a call, wherein the messages comprise address information for media packets within the packet-switched networks associated with the remote call agents, wherein at least one of the received messages includes address information for media packets received at a preceding call agent involved in the set-up of the call, and wherein the messages sent to the other call agent circuits, and the received messages received from the other call agent circuits, are of different message types;

select a set of predetermined rules with which to modify at least one of the received messages based on a message type for the at least one of the received messages; and modify the at least one of the received messages according to the selected set of pre-determined rules by adding address information to, and deleting address information from, the at least one of the received messages.

8. The NAT device of claim 7 wherein the messages sent by the call agent circuitry comprise offer messages, and wherein the received messages received by the call agent circuitry comprise answer messages.

* * * * *

UNITED STATES PATENT AND TRADEMARK OFFICE
CERTIFICATE OF CORRECTION

PATENT NO. : 10,484,435 B2  
APPLICATION NO. : 14/175931  
DATED : November 19, 2019  
INVENTOR(S) : John Aubrey Allen Page 1 of 1

It is certified that error appears in the above-identified patent and that said Letters Patent is hereby corrected as shown below:

In the Specification

In Column 1, Line 7, delete "2007," and insert -- 2007, now Pat. No. 8,649,372, --, therefor.

In Column 4, Line 12, delete "networks." and insert -- networks; --, therefor.

In Column 4, Line 14, delete "networks." and insert -- networks; --, therefor.

In Column 6, Line 17, delete "INVITE sip:vvv@uay.edge.com SIP/2.0" and insert -- INVITE sip:vvv@uav.edge.com SIP/2.0 --, therefor.

In Column 6, Line 18, delete "cau.edge.com:5060," and insert -- cau.edge.com:5060; --, therefor.

In Column 6, Line 62, delete "Contact: <sip:vvv@uay.edge.com" and insert -- Contact: <sip:vvv@uav.edge.com --, therefor.

Signed and Sealed this  
Second Day of June, 2020

Andrei Iancu  
*Director of the United States Patent and Trademark Office*